United States Patent [19]
Kolagotla

[11] Patent Number: 5,883,825
[45] Date of Patent: Mar. 16, 1999

[54] REDUCTION OF PARTIAL PRODUCT ARRAYS USING PRE-PROPAGATE SET-UP

[75] Inventor: Ravi Kumar Kolagotla, Breinigsville, Pa.

[73] Assignee: Lucent Technologies Inc., Murray Hill, N.J.

[21] Appl. No.: 922,735

[22] Filed: Sep. 3, 1997

[51] Int. Cl.[6] .................................................. G06F 7/52
[52] U.S. Cl. ...................................... 364/758; 364/786.04
[58] Field of Search .............................. 364/758, 786.04

[56] References Cited

U.S. PATENT DOCUMENTS

| | | | |
|---|---|---|---|
| 3,535,502 | 10/1970 | Clapper | 364/786.04 |
| 3,636,334 | 1/1972 | Svoboda | 364/786.04 |
| 3,675,001 | 7/1972 | Singh | 364/786.04 |
| 3,723,715 | 3/1973 | Chen et al. | 364/786.04 |
| 3,795,880 | 3/1974 | Singh et al. | 364/758 |
| 3,950,636 | 4/1976 | Dao | 364/758 |
| 5,095,457 | 3/1992 | Jeong | 364/758 |
| 5,303,176 | 4/1994 | Hrusecky et al. | 364/759 |
| 5,586,071 | 12/1996 | Flora | 364/758 |
| 5,798,956 | 8/1998 | Park | 364/758 |

OTHER PUBLICATIONS

"Array Multiplication Scheme Using (p.2) Counters and Pre–Addition" by Vassiliadis, et al., Electronics Lettes, 13th Apr. 1995, vol. 31 No. 8 pp. 619–620.

"An Architecture for High Speed Array Multiplier" by Islam, et al., IEICE Trans Fundamentals vol. E76 A, No. 8, Aug. 1993, pp. 1326–1333.

Primary Examiner—David H. Malzahn
Attorney, Agent, or Firm—David L. Smith

[57] ABSTRACT

There is disclosed a converter for summing inputs includes first, second, third and fourth adders. Each of the adders is adapted to receive a carry-in and to provide as outputs a carry-out and a sum output. Each adder has an associated partial product generated in proximity thereto. The adders are interconnected such that the associated partial product of the first and second adders provide additional inputs to the first adder. The associated partial products of the third and fourth adder provide additional inputs to the second adder. The sum output of the first and second adders provide additional input to the third adder. A sum input to the converter and the sum output of the third adder provide additional inputs to the fourth adder. The output of the fourth adder is the output of the converter.

9 Claims, 9 Drawing Sheets

REDUCTION OF PARTIAL PRODUCT ARRAYS USING PRE-PROPAGATE SET-UP

TECHNICAL FIELD

This invention relates to multipliers and in particular to reduction of partial product arrays using pre-propagate set-up.

BACKGROUND OF THE INVENTION

Several techniques are known to speed-up reduction of an array of partial products in a multiplier. One well known technique is a Wallace tree. Another known technique to speed-up reduction of partial product terms in a multipler is described in "An Architecture For High Speed Array Multiplier" published by F. F. Islam and K. Tamaru in IEICE Transaction Fundamentals, Volume E76-A, No. 8, August 1993, pages 1326–1333. The speed-up technique disclosed by Islam and Tamaru provides the sum input to a linear array of adders as an input to the last adder in the the linear array, shifts the partial product input of each adder to the adder above (except the uppermost adder) but does not provide any speed-up in adding the partial products.

Another known technique to speed-up reduction of partial product terms in a multiplier is described in "Array Multiplication Scheme Using Counters and Pre-Addition" published by S. Vassiliadis, J. Hoekstra and H.-T. Chin in Electronic Letters, Volume 31, No. 8, Apr. 13, 1995, pages 619–620. The column-by-column reduction speed-up technique disclosed has three aspects. Firstly, all partial products are provided to adders early in the column addition sequence, three partial products per adder, until all of the adder inputs are utilized. Secondly, the sum input is provided as an input to the last adder in the column so as to minimize the delay to the sum output. Thirdly, to minimize the number of adders, inputs are provided to each of the adders until each adder, with the exception of at most one adder, has three inputs. Of course, each adder also has a carry output and a sum output. A shortcoming of the Vassiliadis et al technique is that partial products generated at one location must be added at another location which complicates routing of conductors, thereby enlarging the area of the multiplier.

What is needed is a technique for reducing partial product arrays that provides the advantage of speeding up adding the partial products while not complicating routing of conductors as in the Vassiliadis et al technique.

SUMMARY OF THE INVENTION

In accordance with the present invention, a converter for summing inputs includes first, second, third and fourth adders. Each of the adders is adapted to receive a carry-in and to provide as outputs a carry-out and a sum output. Each adder has an associated partial product generated in proximity thereto. The adders are interconnected such that the associated partial product of the first and second adders provide additional inputs to the first adder. The associated partial products of the third and fourth adder provide additional inputs to the second adder. The sum output of the first and second adders provide additional input to the third adder. A sum input to the converter and the sum output of the third adder provide additional inputs to the fourth adder. The output of the fourth adder is the output of the converter.

DETAILED DESCRIPTION

Multipliers in which both the multiplicand and multiplier are n-bit representations of numbers generate n-squared partial products or partial product terms that must be reduced to generate the product. As is known in the art, the partial products are arranged in an array of columns, such as by power of two, and rows for convenience of adding. The partial product array has n rows, one for each of the bits in the multiplicand or multiplier. Columns here refer to the vertical alignment of partial products, and rows refer to the horizontal alignment of partial products, however, as is known in the art they could be interchanged.

Table 1 illustrates an array of n-squared partial products, illustrated for n equal to eight, obtained when multiplying an n-bit representation of x by an n-bit representation of y.

TABLE 1

| | | | | | | | |
|---|---|---|---|---|---|---|---|
| $x_0y_7$ | $x_0y_6$ | $x_0y_5$ | $x_0y_4$ | $x_0y_3$ | $x_0y_2$ | $x_0y_1$ | $x_0y_0$ |
| $x_1y_7$ | $x_1y_6$ | $x_1y_5$ | $x_1y_4$ | $x_1y_3$ | $x_1y_2$ | $x_1y_1$ | $x_1y_0$ |
| $x_2y_7$ | $x_2y_6$ | $x_2y_5$ | $x_2y_4$ | $x_2y_3$ | $x_2y_2$ | $x_2y_1$ | $x_2y_0$ |

TABLE 1-continued

| | | | | | | | | | | |
|---|---|---|---|---|---|---|---|---|---|---|
| | | | $x_3y_7$ | $x_3y_6$ | $x_3y_5$ | $x_3y_4$ | $x_3y_3$ | $x_3y_2$ | $x_3y_1$ | $x_3y_0$ |
| | | $x_4y_7$ | $x_4y_6$ | $x_4y_5$ | $x_4y_4$ | $x_4y_3$ | $x_4y_2$ | $x_4y_1$ | $x_4y_0$ | |
| | $x_5y_7$ | $x_5y_6$ | $x_5y_5$ | $x_5y_4$ | $x_5y_3$ | $x_5y_2$ | $x_5y_1$ | $x_5y_0$ | | |
| $x_6y_7$ | $x_6y_6$ | $x_6y_5$ | $x_6y_4$ | $x_6y_3$ | $x_6y_2$ | $x_6y_1$ | $x_6y_0$ | | | |
| $x_7y_7$ | $x_7y_6$ | $x_7y_5$ | $x_7y_4$ | $x_7y_3$ | $x_7y_2$ | $x_7y_1$ | $x_7y_0$ | | | |

One skilled in the art would know how to generate each of the partial product terms from bit inputs representing the multiplier and multiplicand. For example, the partial product $x_1 \, y_0$ could be generated by a logical AND combination of the $x_1$ and $y_0$ inputs.

As stated above, when multiplying two n-bit representation bits of numbers, the partial product array has n rows. The partial products are generated in a two-dimensional array or grid substantially as shown in relative position in Table 1. The partial products are reduced, by column, using one-bit adders. Each column of partial products requires one fewer one-bit adder than the number of partial products in the column. Reducing the n rows of partial products to two rows of partial products in the process of generating the product requires up to n-1 one-bit adders per column. The columns of partial products are added with sums moving downward (relative to the partial products as shown in Table 1) and carries moving to the left (also relative to the partial products as shown in Table 1).

Figure 1:
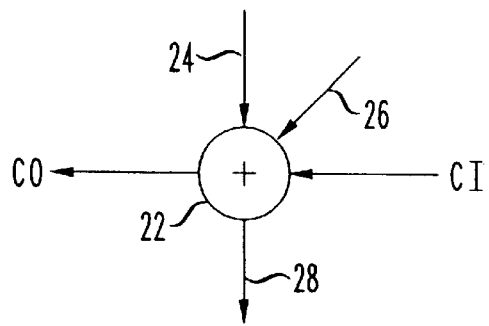
FIG. 1 is a schematic diagram of one adder cell showing the inputs and outputs.

A schematic diagram of one adder cell is shown in FIG. 1. A compressor 20 (shown in FIG. 2) in accordance with the present invention includes a plurality of k adders 22. Adders 22 are one-bit adders and may be full adders as know in the art. Each adder 22 has three inputs 24, 26 and a carry-in CI. Each adder 22 also has two outputs: a carry-out CO and a sum output 28. Adders 22 add inputs 24, 26 and CI to produce as outputs sum 28 and carry-output CO.

Adders 22, when reducing partial products as part of a multiplier, are arranged in an array that corresponds with the array or grid of partial products such that there is a partial product generated in the proximity of each adder. Adders 22 that comprise compressor 20 may be a subset of adders reducing the array of partial product as part of a multiplier. Adders 22 that comprise compressor 20 may be arranged in a column, corresponding to a column or a portion of a column, of partial products. Adder 22 receives as one input a carry-in CI that is the carry-out from an adjacent column of adders, if present, and provides as an output a carry-out CO that is a carry-in to an adder in another, adjacent column of adders.

Inputs 24 and 26 provide two additional inputs to each adder 22. Inputs 24 and 26 are comprised of partial products, sum outputs from other adders 22 or a sum input to the converter.

Figure 2:
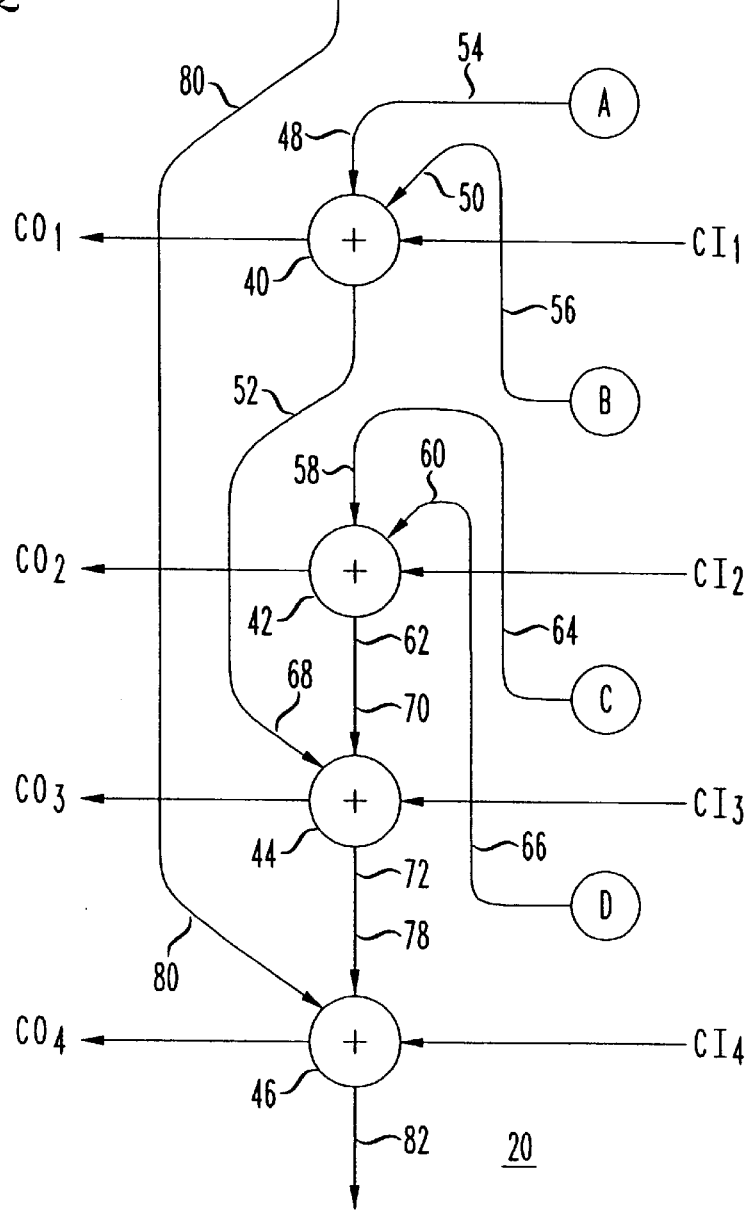
FIG. 2 is a nine-input, five-output compressor utilizing four one-bit adders in accordance with the present invention.

A compressor 20 in accordance with the present invention is shown in FIG. 2. Compressor 20 is a nine:five compressor, having nine inputs and five outputs. Compressor 20 is comprised of four adders 22 designated 40, 42, 44, and 46 forming an array sometimes referred to as a linear array. Partial products (hereafter designated generally as capital letters) A, B, C and D are generated in proximity to adders 40, 42, 44, and 46, respectively.

Adder 40 receives as inputs $CI_1$ and inputs 48 and 50, which are respectively partial products A and B. Adder 40 adds the inputs to produce outputs carry-out $CO_1$ and sum output 52. Partial products A and B are routed over conductors 54 and 56 to provide inputs 48 and 50 to adder 40.

Adder 42 receives as inputs $CI_2$ and inputs 58 and 60, which respectively are partial products C and D. Adder 42 adds the inputs to produce outputs carry-out $CO_2$ and sum output 62. Partial products C and D are routed over conductors 64 and 66 to provide inputs 58 and 60 to adder 42.

Adder 44 receives as inputs $CI_3$ and inputs 68 and 70, which respectively are the sum output 52 from adder 40 and the sum output 62 from adder 42. Adder 44 adds the inputs to produce outputs carry-out $CO_3$ and sum output 72.

Adder 46 receives as inputs $CI_4$ and inputs 78 and 80, which are respectively the sum output 72 from adder 44 and a sum input to compressor 20. Adder 46 adds the inputs to produce outputs carry-out $CO_4$ and sum output 82. Sum output 82 is also the output of compressor 20.

In this manner, the input-to-output delay to which sum input 80 is subjected is minimized due to sum 80 passing only through a single adder, adder 46. Each of the partial products associated with an adder is utilized as an input to an adder within two adders of where the partial product is generated. Furthermore, rather than have sums pass serially through the linear array of adders 40, 42, 44 and 46, as in the prior art shown in FIGS. 8 and 10, generation of sum output 82 requires less time due to generating sum outputs 52 and 62 in parallel in adders 40 and 42, and providing these outputs as inputs 68 and 70 to adder 44, thereby not requiring the sum output 82 generation to pass serially through each of adders 40, 42, 44 and 46.

Figure 3:
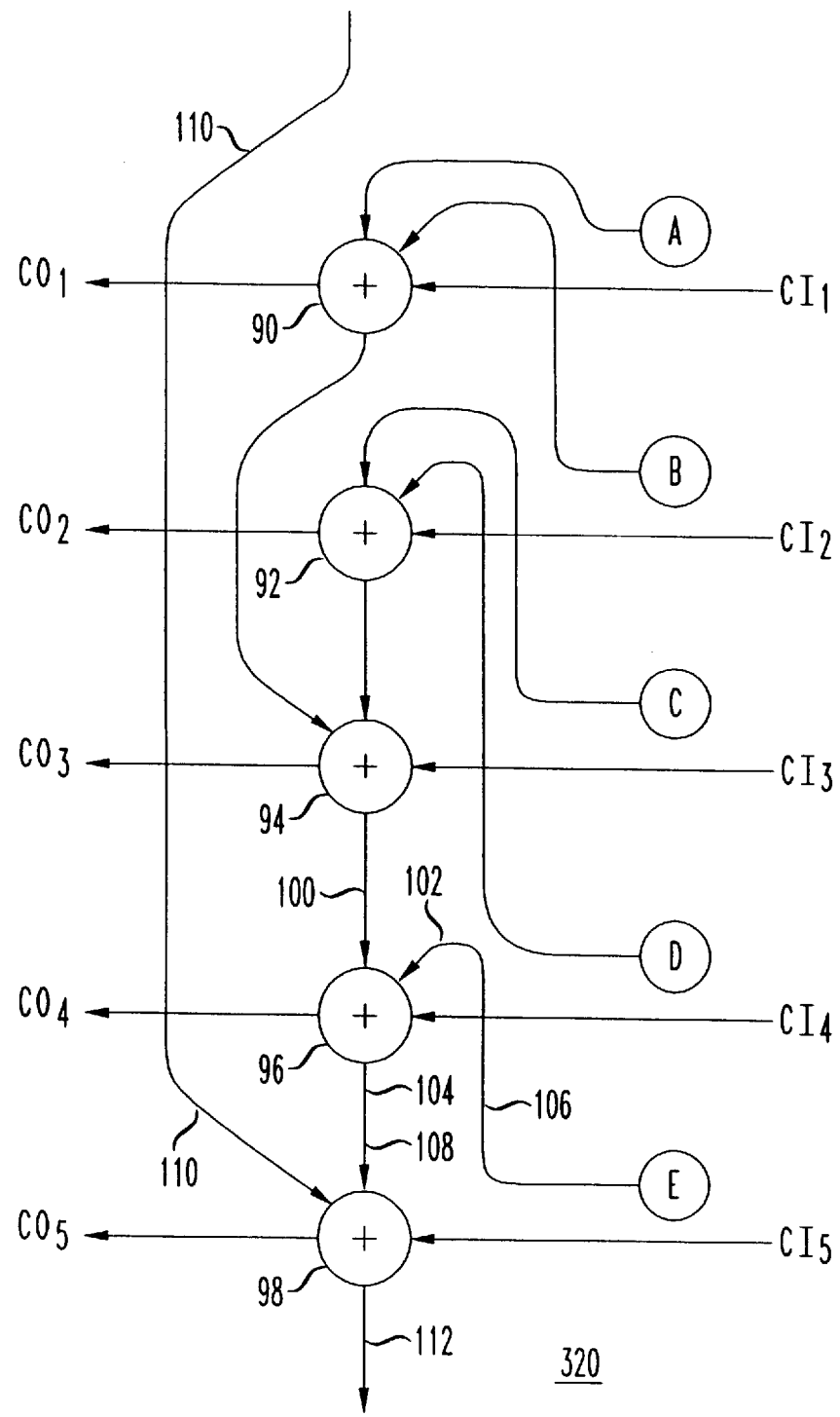
FIG. 3 is an eleven-input, six-output compressor utilizing five one-bit adders in accordance with the present invention.

A compressor 320 having 11 inputs and 6 outputs is shown in FIG. 3. Compressor 320 is comprised of five adders 22 designated 90, 92, 94, 96 and 98 forming a linear array of adders. Operations of adders 90, 92 and 94 are substantially the same as operation of adders 40, 42 and 44 and therefore an explanation of their operation is not repeated here. Adder 96 receives as inputs $CI_4$ and inputs 100 and 102, which are respectively the sum output of adder 94 and partial product E. Adder 96 adds the inputs to produce outputs carry-out $CO_4$ and sum output 104. Partial product E is routed over conductor 106 to provide input 102 to adder 96. Adder 98 receives as inputs $CI_5$ and inputs 108 and 110, which are respectively the sum output 104 from adder 96 and a sum input to compressor 320. Adder 98 adds the inputs to produce carry-out $CO_5$ and sum output 112. Sum output 112 is also the output of compressor 320. Note that even with the addition of partial product E, generated in proximity to adder 98, each of the partial products associated with an adder is utilized as an input to an adder in the linear array of adders within two adders of where the partial product is generated. Sum input 110 is provided to an adder that produces the sum output of compressor 320.

Figure 4:
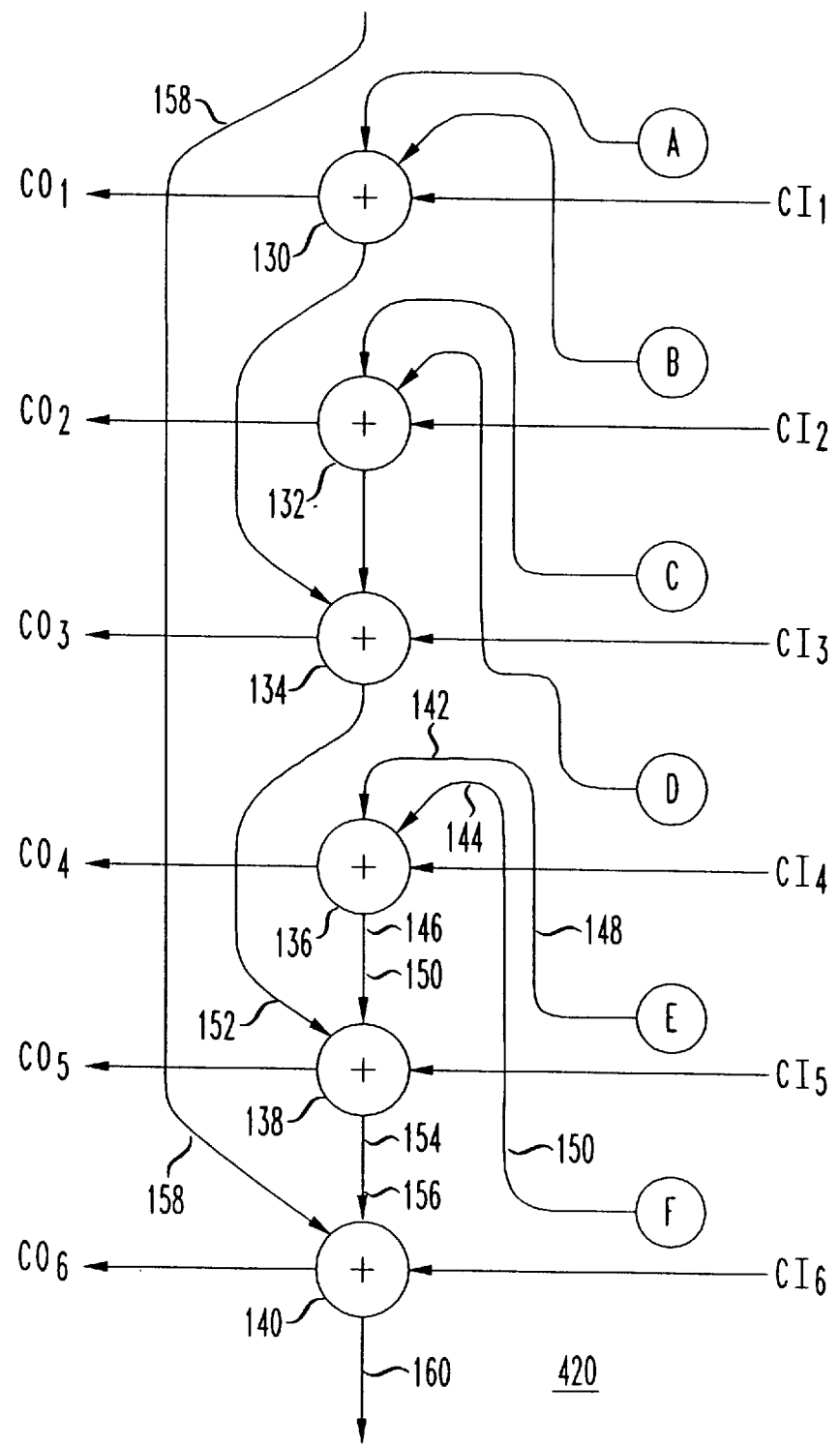
FIG. 4 is a thirteen-input, seven-output compressor utilizing six one-bit adders in accordance with the present invention.

A 13-input, 7-output compressor 420 is shown in FIG. 4. Compressor 420 is comprised of six adders 22 designated 130, 132, 134, 136, 138 and 140 forming a linear array of adders. Partial products A through F are generated in proximity to respective adders 130 through 140. Adders 130, 132 and 134 operate similarly to adders 90, 92 and 94 as well as adders 40, 42 and 44. The presence of an additional partial product F in compressor 420, as compared to compressor 320, alters the inputs to the fourth adder in the linear array of adders comprising compressor 420 as compared to the fourth adder of the linear array of adders comprising compressor 320. Adder 136 receives carry-input $CI_4$ and inputs 142 and 144 which respectively are partial products E and F. Adder 136 adds the inputs to produce carry-output $CO_4$ and sum output 146. Partial products E and F are routed over conductors 148 and 150 to provide inputs 142 and 144 to adder 136 within two adders, in the linear array of adders, of where they are generated. Adder 138 receives as inputs $CI_5$ and inputs 150 and 152, which respectively are the sum output 146 from adder 136 and the sum output 152 from adder 134. Adder 138 adds the inputs to produce carry-output $CO_5$ and sum output 154.

Adder 140 receives as inputs $CI_6$ and inputs 156 and 158, which are respectively the sum output 154 from adder 138 and a sum input to compressor 420. Adder 140 adds the inputs to produce outputs carry-out $CO_6$ and sum output 160. Sum output 160 is also the output of compressor 420.

Figure 5:
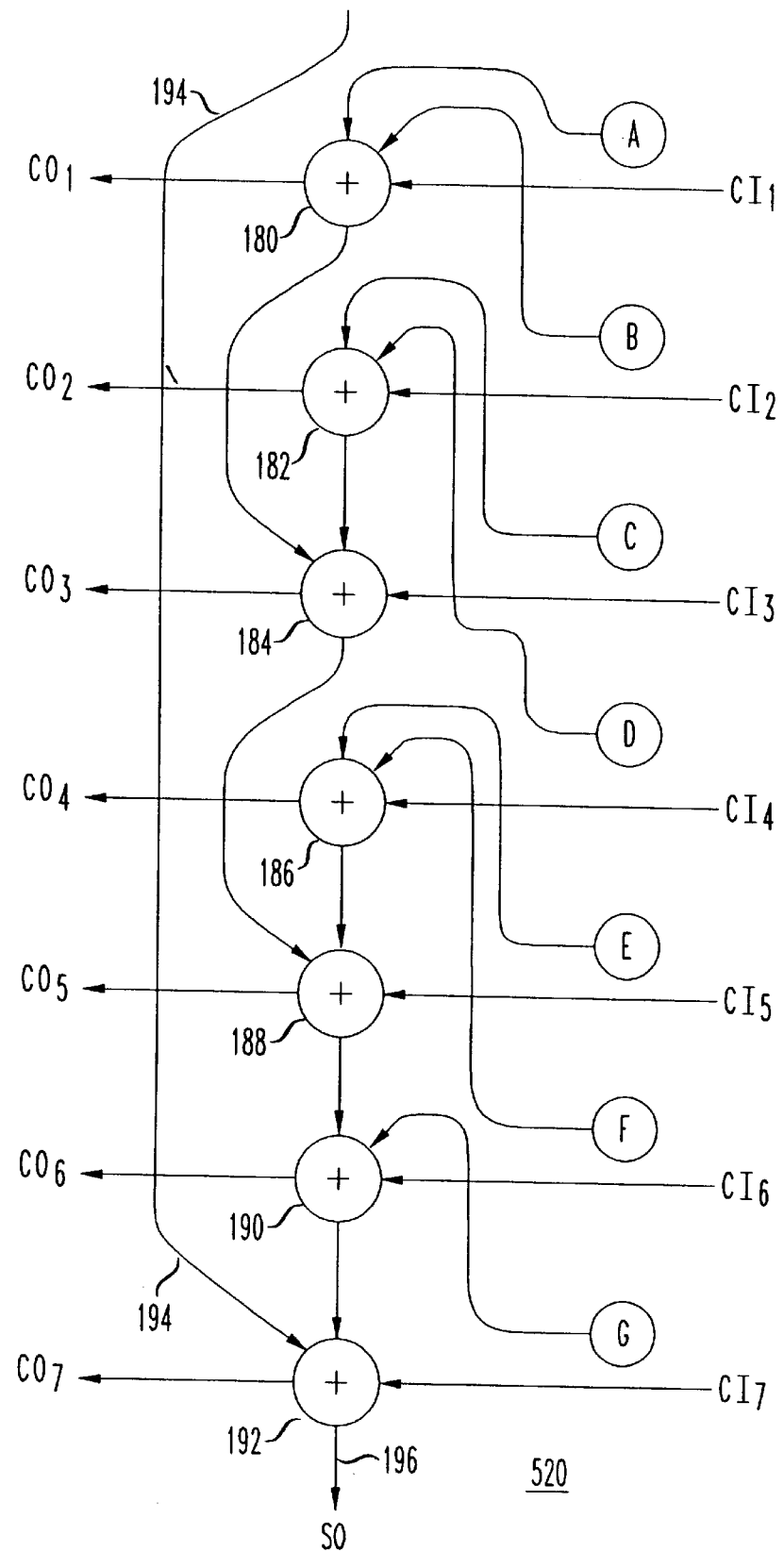
FIG. 5 is a fifteen-input, eight-output compressor utilizing seven one-bit adders in accordance with the present invention.

A compressor 520, in accordance with the present invention, having 15 inputs and 8 outputs is shown in FIG. 5. Compressor 520 is comprised of seven adders 22 designated 180, 182, 184, 186, 188, 190 and 192. Compressor 520 includes an additional partial product G not present in compressor 420 of FIG. 4. Partial product G is provided as one input to adder 190 to maintain utilization of partial products as an input to an adder within two adders in the linear array of adders where the partial product is generated. The sum input 194 is provided to the final adder 192 to minimize the input-to-output delay to which sum input 194 is subjected. Sum output 196 is both the output of adder 192 and the output of compressor 520.

Figure 6:
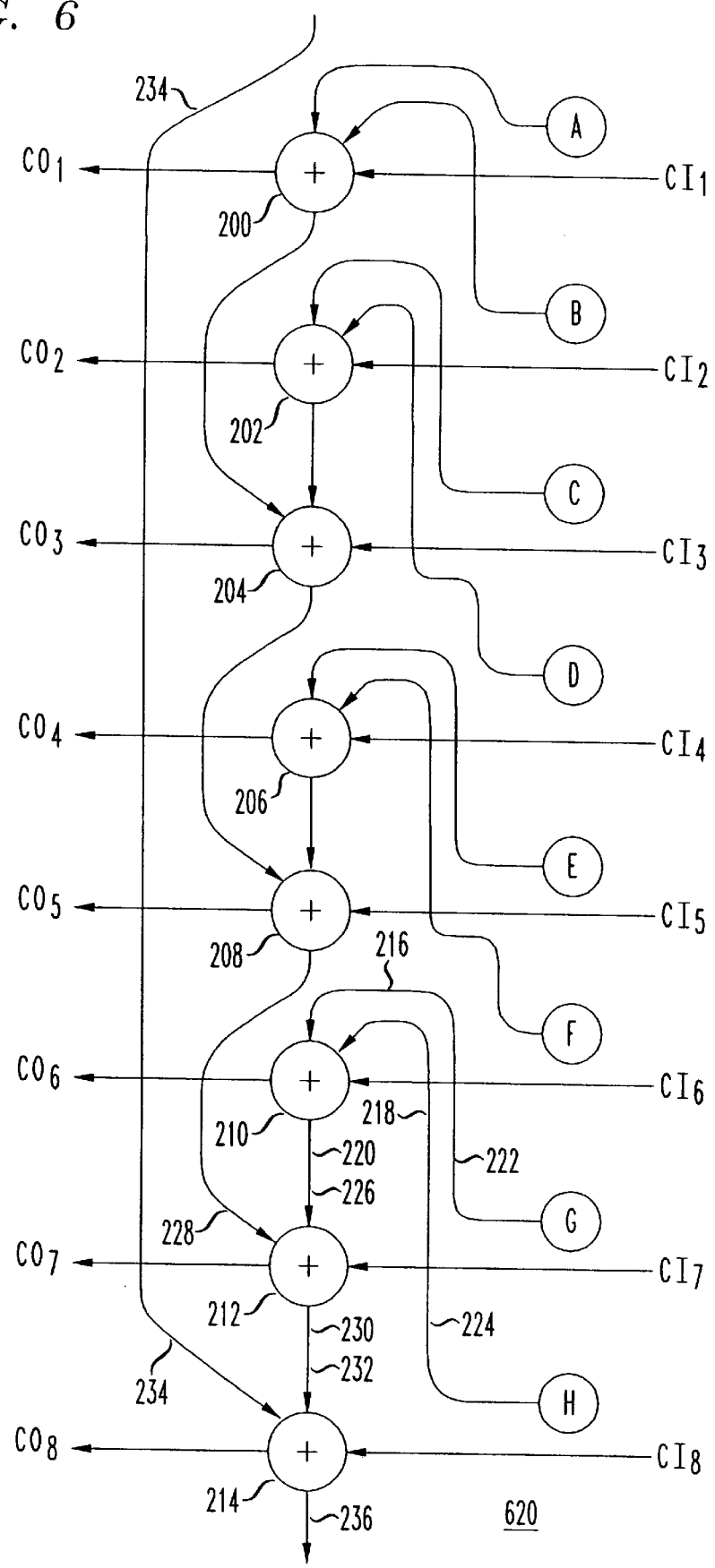
FIG. 6 is a seventeen-input, nine-output compressor utilizing eight one-bit adders in accordance with the present invention.

A compressor 620, in accordance with the present invention, having 17 inputs and 9 outputs is shown in FIG. 6. Compressor 620 is comprised of eight adders 22 designated 200, 202, 204, 206, 208, 210. 212 and 214. Compressor 620 includes partial product H not present in the compressor 520 of FIG. 5. Adder 210 receives as inputs carry-in $CI_6$ and inputs 216 and 218, which respectively are partial products G and H. Adder 210 adds the inputs to produce outputs carry-out $CO_6$ and sum output 220. Partial products G and H are routed over conductors 222 and 224 to provide inputs 216 and 218 to adder 210. Adder 212 receives as inputs $CI_7$ and inputs 226 and 228, which respectively are the sum output 220 from adder 210 and the sum output 228 from adder 208. Adder 212 adds the inputs to produce outputs to carry-out $CO_7$ and sum output 230.

Adder 214 receives as inputs $CI_8$ and inputs 232 and 234, which are respectively the sum output 230 from adder 212 and a sum input to compressor 620, when present. Adder 214 adds the inputs to produce outputs carry-out $CO_8$ and sum output 236. Sum output 236 is not only the sum output from adder 214 but also the output from compressor 620.

Figure 7:
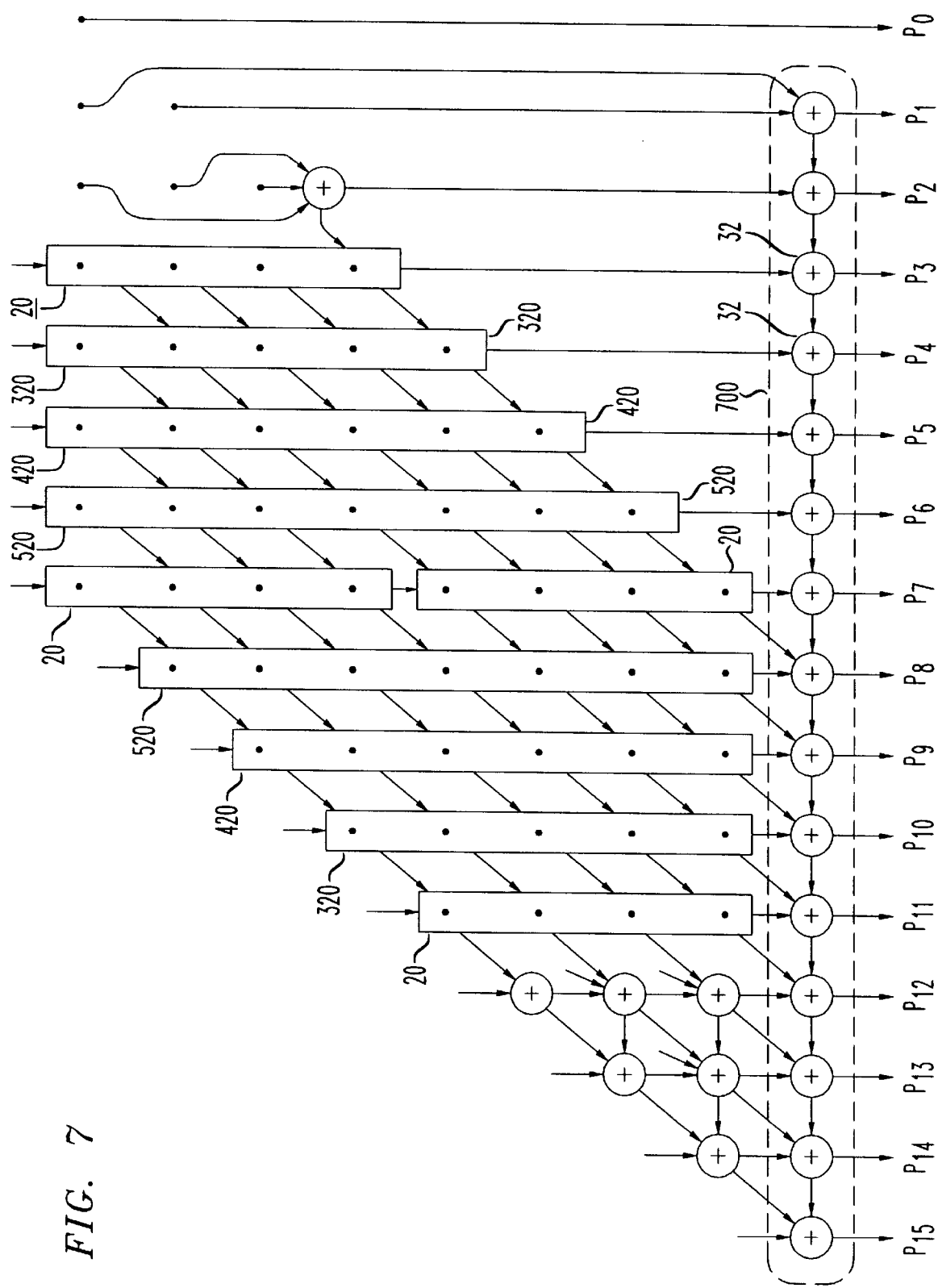
FIG. 7 is a multiplier illustrating multiple compressors used in reducing a single column of partial products and compressors used in multiple columns in accordance with the present invention.

FIG. 7 illustrates one of the possible array reduction techniques for reducing an array of partial products. FIG. 7 illustrates that more than one compressor can be used in reducing a column of partial products and also that compressors may be used in more than one column of an array of partial products being reduced. The two input adders are half-adders 32 and the three input adders are full adders 22. Adders 700 receive the outputs from converters and other adders and provide the product representation, P, of the summed partial products. The carry-out signals from a given column are provided as carry-in signals to an adjacent column. The carry-out signals received as carry-in signals may be added at any location in the column.

Figure 8:
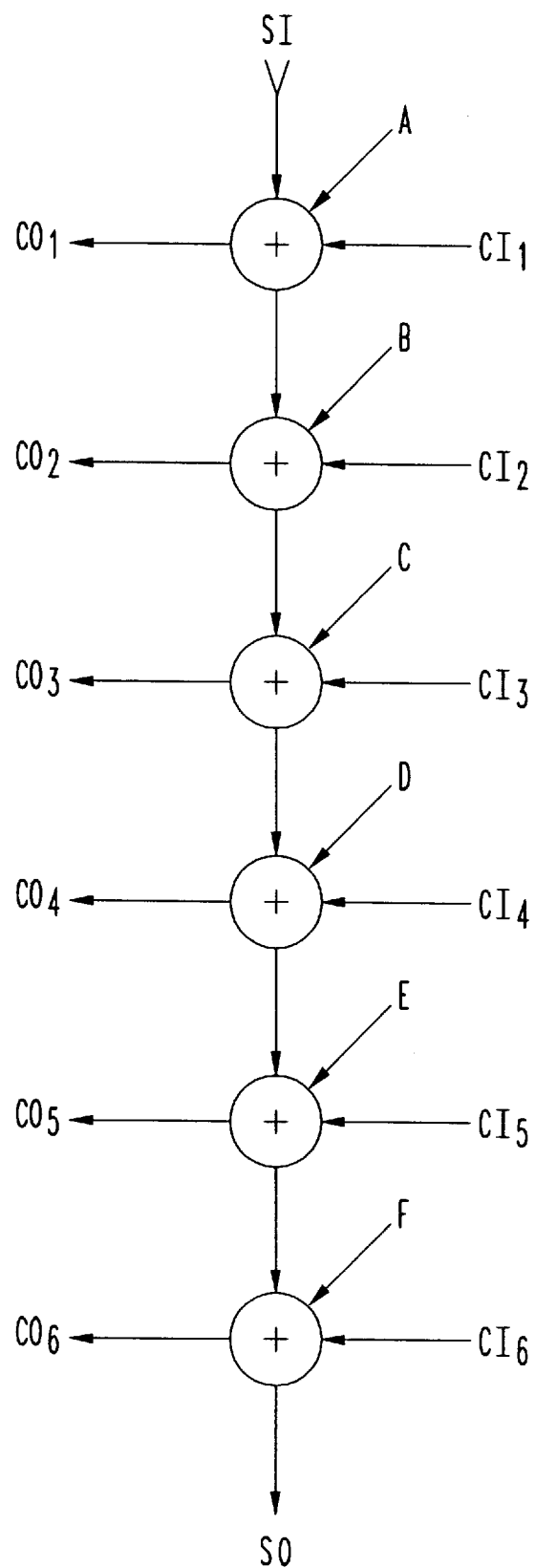
FIG. 8 is a compressor illustrating an array reduction technique of the prior art.

FIG. 8 is a series of one-bit adders illustrating an array reduction technique of the prior art. In the illustrated technique, the sum input is received as an input to the uppermost one-bit adder. The sum output of each one-bit adder is passed downward in a column to the next one-bit adder. The partial products provide an input to the one-bit adder in the position in which they are generated. Note that the sum input passes through each one-bit adder. Furthermore, the partial products do not require rerouting due to the partial products being an input to a one-bit adder in the position in which they are generated.

Figure 9:
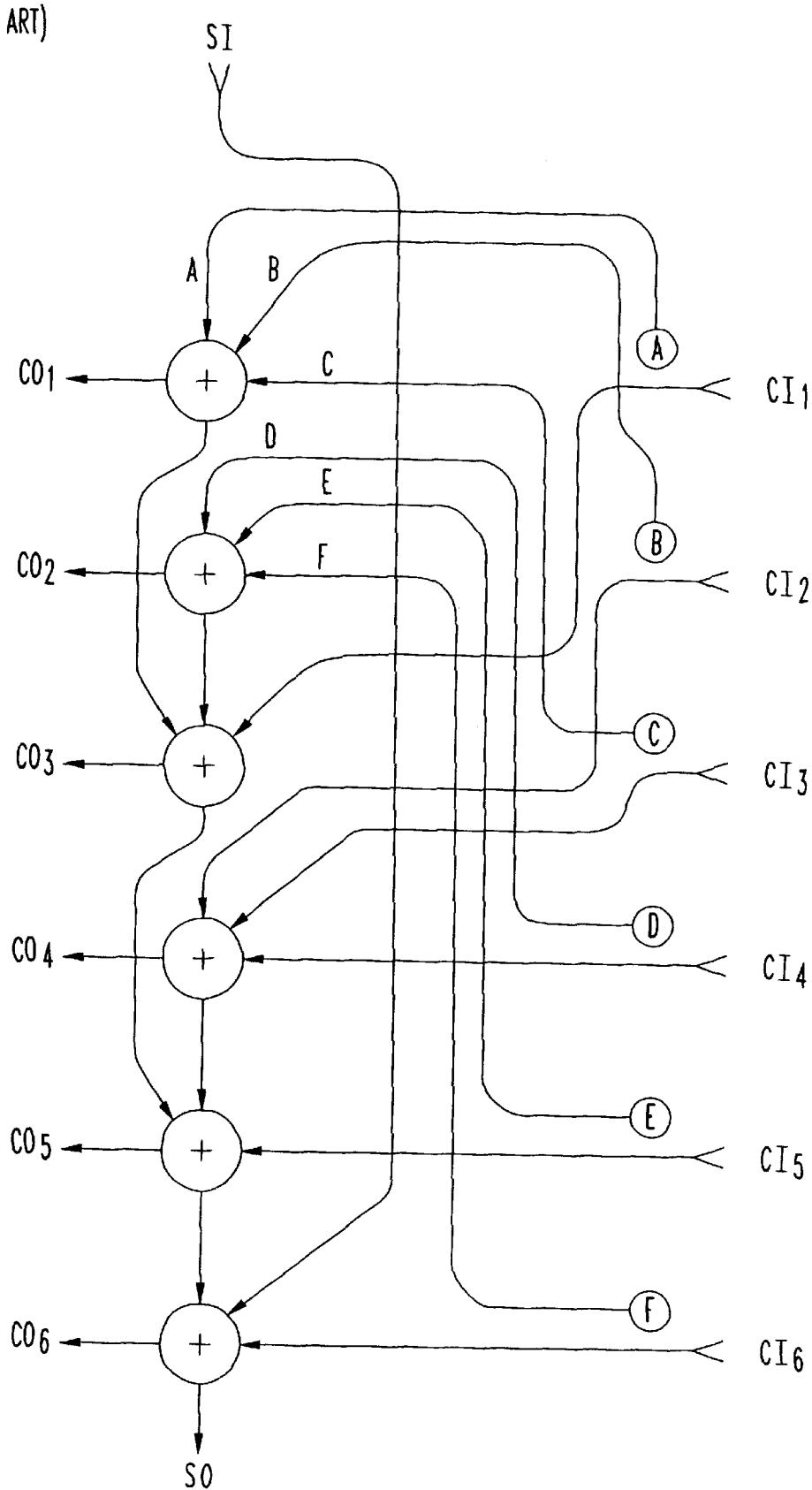
FIG. 9 is another compressor illustrating an array reduction technique of the prior art.

FIG. 9 illustrates the array reduction technique of Vassiliadis et al. The sum input is provided as an input to the bottom one-bit adder and there is some re-routing of the partial products and carry-inputs.

Figure 10:
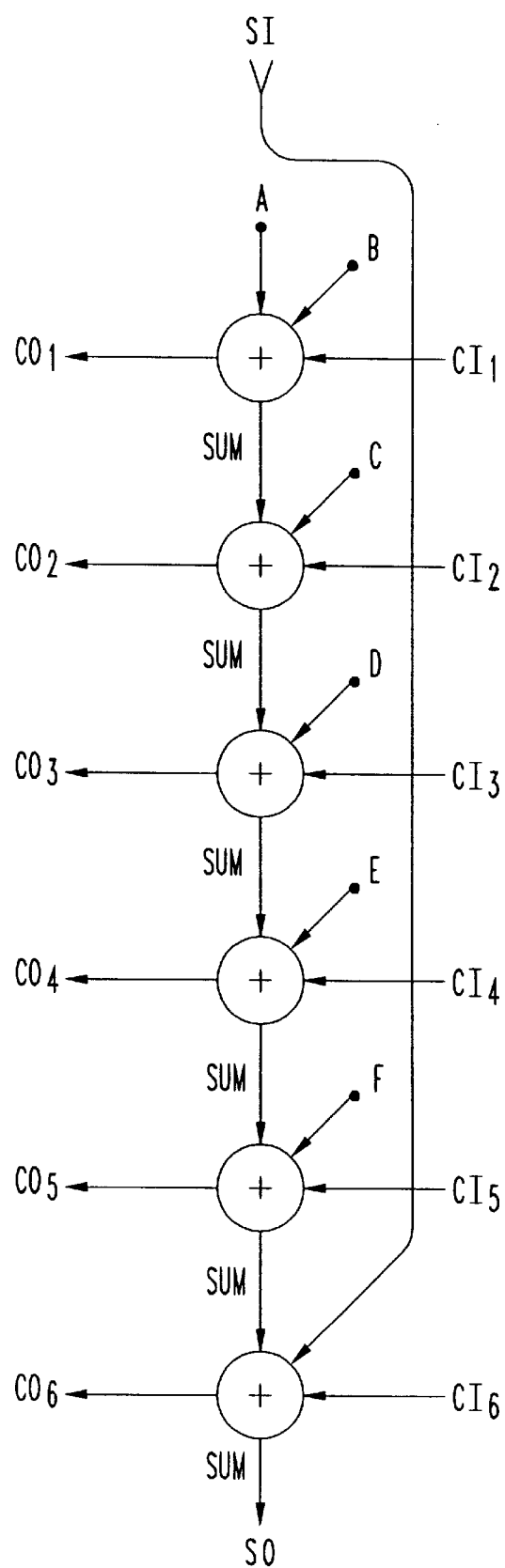
FIG. 10 is yet another compressor illustrating an array reduction technique of the prior art.

FIG. 10 illustrates the array reduction technique of Islam and Tamaru. The sum input is provided as an input to the bottom one-bit adder. The partial product that otherwise would be provided to the bottom one-bit adder is shifted to be an input to the one-bit adder above, with a ripple effect through all adders except the uppermost adder. The uppermost one-bit adder thus receives two inputs that are partial products. No other rerouting of the partial products occurs.

It is not necessary for all of the one-bit adders reducing a column of partial products to be replaced by a compressor, or all of the columns of adders reducing partial products to include a compressor for the multiplier to be within the scope of the present invention. A portion of the partial products in a column may be reduced in a known manner and the remaining partial products may be reduced employing a compressor in accordance with the present invention. Some column of partial products may not employ a compressor in accordance with the present invention while other columns of partial products include a compressor in accordance with the present invention. Furthermore, more than one compressor may be employed in a single column reducing partial products.

The invention may be fabricated using any very large scale integrated circuit process in one or more integrated circuits. The integrated circuits, for example, may be a microcontroller, a microprocessor or a digital signal processor.

Multipliers in accordance with the present invention provide a linear array of adders in which partial products are used no more than two adders from where they are generated, the wiring routing results in a regular layout, and the sum of partial products is faster than in the prior art thereby reducing the time required to complete a multiply operation. The invention provides an advantage in less complex routing of partial products, which translates into less silicon area required to fabricate a multiplier incorporating the invention.

While the invention has been described as employing n-bit binary representations of the multiplier and multiplicand, the invention is not limited to binary representations of numbers or to multipliers. The invention is useful with many reduction techniques, types of multipliers, and radixes. The invention may be used with any parallel multiplier, without regard to the radix or two's complement correction method. Furthermore, the invention may be used in multi-input adders where the partial products in the above description are replaced with inputs to the multi-input adder.

While the illustrative embodiment of the invention has not been described as incorporating pipelining, one skilled in the art would recognize the enhanced computation efficiently available by utilizing pipelining in the design. Pipelining is achieved by initiating computation with a new data set before completing computations with a previous set of data. The more latches used in pipelining, the greater the depth of pipelining. Pipelining causes an initial latency in computation time required to fill the pipeline, but maximizes the use of resources such as adders and multipliers.

The invention claimed is:

1. A converter for summing inputs, comprising:

first, second, third and fourth adders, each of the adders adapted to receive a carry-in and to provide as outputs a carry-out and a sum, each adder having an associated term generated in proximity thereto, the adders interconnected such that the associated term of the first and second adders provide additional inputs to the first adder and the associated term of the third and fourth adders provide additional inputs to the second adder, the sum output of the first and second adders providing additional inputs to the third adder, and a sum input and the sum output of the third adder providing additional inputs to the fourth adder.

2. A converter as recited in claim 1, wherein the adders form a linear array.

3. A converter for summing inputs, comprising:

at least four adders, the at least four adders being first, second, third and fourth adders, each of the at least four adders adapted to receive a carry-in and to provide as outputs a carry-out and a sum, each of the at least four adders having a corresponding tern generated in proximity thereto, the at least four adders interconnected such that each of the at least four adders has two additional inputs with the respective corresponding terms being a subset of the additional inputs to adders of the at least four adders within two adders of where the respective corresponding term is generated.

4. A converter as recited in claim 3, wherein the at least four adders form a linear array, the corresponding term associated with the first and second adders providing additional inputs to the first adder and the corresponding term associated with the third and fourth adders providing additional inputs to the second adder.

5. A converter as recited in claim 3, wherein the converter is fabricated in an integrated circuit.

6. A converter as recited in claim 5, wherein the integrated circuit is a microprocessor.

7. A converter as recited in claim 5, wherein the integrated circuit is a digital signal processor.

8. A multiplier for summing partial products to generate a product, comprising:

a first converter for reducing partial products in a column of partial products, the first converter including first, second, third and fourth adders, each of the adders adapted to receive a carry-in and to provide as outputs a carry-out and a sum, each adder having an associated term generated in proximity thereto, the adders interconnected such that the associated term of the first and second adders provide additional inputs to the first adder and the associated term of the third and fourth adders provide additional inputs to the second adder, the sum output of the first and second adders providing additional inputs to the third adder, and a sum input and the sum output of the third adder providing additional inputs to the fourth adder; and a second converter for reducing partial products in the column of partial products, the second converter including fifth, sixth, seventh and eighth adders, each of the adders adapted to receive a carry-in and to provide as outputs a carry-out and a sum, each adder having an associated term generated in proximity thereto, the adders interconnected such that the associated term of the fifth and sixth adders provide additional inputs to the fifth adder and the associated term of the seventh and eighth adders provide additional inputs to the sixth adder, the sum output of the fifth and sixth adders providing additional inputs to the seventh adder, and a sum input and the sum output of the seventh adder providing additional inputs to the eighth adder.

9. A multiplier for summing partial products to generate a product, comprising:

a first converter for reducing partial products in a first column of partial products, the first converter including first, second, third and fourth adders, each of the adders adapted to receive a carry-in and to provide as outputs a carry-out and a sum, each adder having an associated term generated in proximity thereto, the adders interconnected such that the associated term of the first and second adders provide additional inputs to the first adder and the associated term of the third and fourth adders provide additional inputs to the second adder, the sum output of the first and second adders providing additional inputs to the third adder, and a sum input and the sum output of the third adder providing additional inputs to the fourth adder; and a second converter for reducing partial products in a second column of partial products, the second converter including fifth, sixth, seventh and eighth adders, each of the adders adapted to receive a carry-in and to provide as outputs a carry-out and a sum, each adder having an associated term generated in proximity thereto, the adders interconnected such that the associated term of the fifth and sixth adders provide additional inputs to the fifth adder and the associated term of the seventh and eighth adders provide additional inputs to the sixth adder, the sum output of the fifth and sixth adders providing additional inputs to the seventh adder, and a sum input and the sum output of the seventh adder providing additional inputs to the eighth adder.

* * * * *